April 16, 1935.  R. D. BROWN  1,998,356
KNIFE HANDLE AND METHOD OF MAKING SAME
Filed Feb. 21, 1933

Inventor
R. D. Brown.
By Lacey & Lacey,
Attorneys

Patented Apr. 16, 1935

1,998,356

UNITED STATES PATENT OFFICE 1,998,356

KNIFE HANDLE AND METHOD OF MAKING SAME

Richard D. Brown, Olean, N. Y.

Application February 21, 1933, Serial No. 657,918

3 Claims. (Cl. 18—59)

This invention relates to knife handles and method of making the same.

The object of the invention is to provide a knife handle including a central core having notches or depressions formed in one side thereof which serve to receive and lock a plastic enveloping jacket or shell thereon, whereby the core and shell are firmly united and finger receiving depressions are provided in the handle to facilitate grasping the same when said handle is fitted to the shank of a hunting or other type of knife.

The invention further contemplates a novel method or process of forming the plastic enveloping jacket or shell and fitting the same to the centering core whereby the cost of manufacture is reduced and a durable and thoroughly efficient article is produced.

In the accompanying drawing forming a part of this specification:

Similar numerals of reference indicate corresponding parts in all the figures of the drawing.

Figure 9:
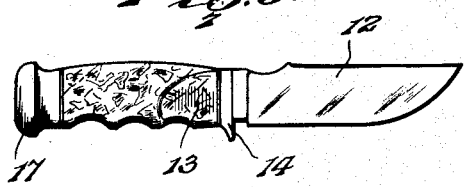
Figure 9 is a side elevation of a hunting knife showing the improved handle in position thereon.

The improved handle forming the subject matter of the present invention is principally designed for attachment to hunting knives of the type illustrated in Figure 9 of the drawing but it will be understood that the handle may be used in connection with any desired type or style of knife.

Figure 1:
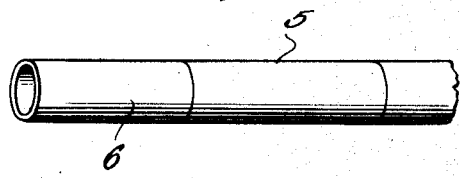
Figure 1 is a perspective view of a length of tubular material from which the enveloping jacket or shell of the handle is formed.
Figure 2:
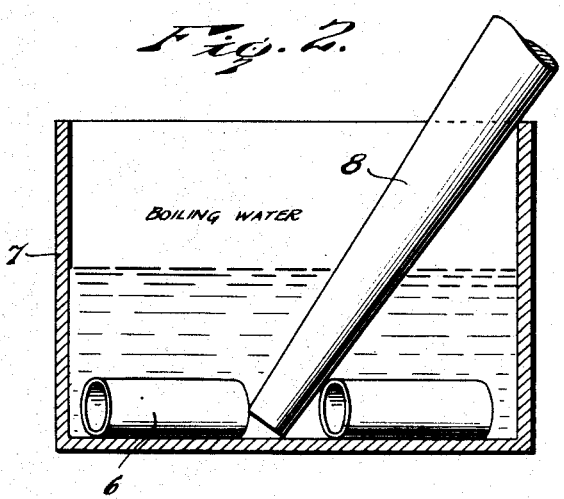
Figure 2 is a vertical sectional view showing the manner of heating the shell or jacket sections and the expanding mandrel.
Figure 3:
Figure 3 is a longitudinal sectional view showing the mandrel inserted in one of the handle sections for enlarging the bore thereof.
Figure 4:
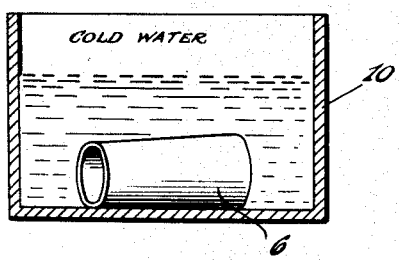
Figure 4 is a vertical sectional view of the tank for cooling and setting the shell or jacket sections after the bores thereof have been expanded or enlarged.
Figure 5:
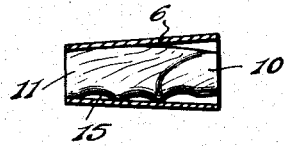
Figure 5 is a longitudinal sectional view showing a core within one of the jacket sections and before heating the same.
Figure 6:
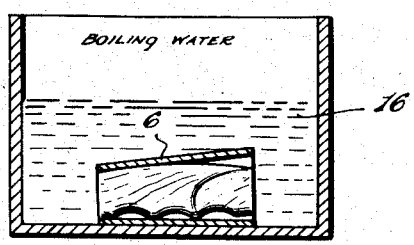
Figure 6 is a vertical sectional view showing a jacket section and core assembled and submerged in hot water to effect shrinking of the jacket section around the core.
Figure 7:
Figure 7 is a top plan view of the core detached.

In carrying the invention into effect, I take a tubular body portion 5 formed of celluloid or other plastic material capable of becoming soft or pliable when subjected to the action of heat and this body portion is cut into shell or jacket sections 6 of predetermined length, according to the length of the handle of the knife on which it is to be used. After determining the length of the handle to be formed, a corresponding length of material is cut or severed from the tubular body portion and submerged in a tank 7 containing boiling water and allowed to remain submerged for approximately one-half to one minute so as to soften the plastic material and render it sufficiently pliable to be easily worked or manipulated. During the heating of the shell or jacket sections 6 a mandrel 8 is also preferably submerged in the boiling water to heat the same. The jacket sections 6 are then removed from the tank 7 and also the heated mandrel 8, which latter is preferably covered with a layer or coating of heavy grease, and the small or tapered end 9 of the mandrel is inserted in the bore of one of the jacket or shell sections 6 so as to expand or enlarge said bore. The jacket or shell section is then slipped off of the small end of the mandrel and submerged in cold water within a tank or container 9' so as to set the shell section and cause it to retain its proper shape. The shell or jacket section is then removed from the bath of cold water and a core 10, preferably formed of wood, is introduced within said shell or jacket section, as best shown in Figure 5 of the drawing. This core 10 is of substantially the same length as the shell or jacket section and is provided with a longitudinal bore 11 adapted to receive the shank of a hunting knife, indicated at 12. The opposite side walls of the core 10 at one end thereof are preferably inclined or beveled at 13 so that when the jacket is positioned thereon, the exterior wall of the jacket will taper or merge into the abutment 14 of the knife and thus present a smooth inclined surface at the junction of the blade and handle, as best shown in Figure 9 of the drawing.

Figure 8:
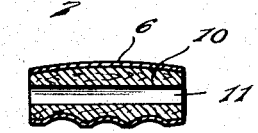
Figure 8 is a longitudinal sectional view of the complete handle prior to its attachment to the shank of a knife.

One longitudinal edge of the core 10 is formed with a series of notches or depressions 15 and these depressions not only form finger grips when the jacket is shrunk thereon but also serve to receive the plastic material constituting the shell or jacket and thus effectually lock the shell or jacket firmly in position on the core. After the core has been inserted within the shell or jacket section 6, as shown in Figure 5 of the drawing, said core, with the jacket section in position thereon, is immersed in a body of boiling water contained in a tank 16 and allowed to remain therein for a predetermined period, usually from one-half to three-fourths of a minute. The action of the boiling water on the plastic material constituting the shell or jacket section causes the material to shrink and conform to the shape of and adhere to the exterior walls of the core while, at the same time, the plastic material is forced within the notches or depressions 15 so that the jacket will have an interlocking fit with the core and cause the parts to be firmly united, as best shown in Figure 8 of the drawing. The core, with the jacket or shell firmly adhering thereto, is then allowed to cool and dry for approximately three or four days, after which it is slipped over the shank of the knife 12 and secured in position thereon by the usual cap piece 17. It will thus be seen that the notches or depressions in the core 10 not only serve to prevent independent movement of the core with respect to the enveloping shell but also provide depressions for the reception of the fingers when grasping the knife and thus insure a firm grip on the handle at all times. It will be noted that the core tapers from the medial transverse center thereof toward the opposite ends of the core so that during the shrinking of the plastic shell or jacket the material of which the jacket is formed will grip the tapered ends of the core and further assist in preventing accidental displacement of the shell therefrom. The shell or jacket may be ornamented or embellished in any suitable manner to give it a mottled or other pleasing appearance.

Having thus described the invention, what I claim is:

1. The method of forming a knife handle consisting of cutting a tubular body of plastic material to provide a tubular shell of predetermined length and unbroken throughout its circumference, immersing the shell and a tapered mandrel in boiling water to heat the mandrel and soften the shell, removing the shell and mandrel from the water and after applying a lubricant to the mandrel introducing the small end thereof into the shell to expand the shell and impart a tapered formation thereto, removing the shell from the mandrel and immersing the shell in cold water to set the shell, removing the shell from the cold water and introducing into the shell through the large end thereof a rigid core tapered toward its ends and having one longitudinal edge thereof formed with a series of recesses, immersing the core and shell in boiling water to shrink the shell tightly about the core in smooth fitting conformity thereto whereby the shell will be held firmly upon the core and portions of the shell engaged in the recesses to define finger receiving seats, and subsequently removing the core and shrunken shell from the hot water and cooling and drying the assembled core and shell.

2. The method of forming a knife handle consisting of forming a rigid core tapered toward its opposite ends and having a series of recesses along one longitudinal edge thereof, cutting a tubular body of plastic material to form a tubular plastic shell of substantially the same length as the core, subjecting the shell to moist heat to soften the plastic material, introducing a tapered shaper into the softened shell to impart a longitudinal taper to the shell, removing the shell from the shaper and chilling the shell to set the plastic material, fitting the core into the shell through the large end thereof with ends of the core substantially flush with the ends of the shell, subjecting the assembled core and shell to moist heat to shrink the shell tightly about the core in smooth fitting engagement therewith with portions of the shell sunken into the recesses to define external finger receiving seats, and subsequently removing the core and shrunken shell from the influence of the moist heat and cooling and drying the same.

3. The method of forming a knife handle consisting of forming a rigid core having a longitudinally extending bore to receive the shank of a blade, forming a tubular shell of plastic material, the shell being unbroken throughout its circumference and of approximately the same length as the core, immersing the shell in boiling water to soften the plastic material, expanding the softened shell to impart a longitudinal taper thereto, immersing the expanded shell in cold water to set the plastic material, removing the shell from the cold water and fitting the core into the shell to dispose the shell about the core with its ends substantially flush with ends of the core, immersing the core and shell in boiling water to soften the plastic material and shrink the shell tightly about the core in smooth fitting engagement therewith, and subsequently removing the assembled core and shrunken shell from the boiling water and cooling and drying the same.

RICHARD D. BROWN. [L. s]